(12) United States Patent
Kulik

(10) Patent No.: US 6,458,747 B1
(45) Date of Patent: Oct. 1, 2002

(54) SLOW ACTING FERTILIZER COMPOSITION AND METHOD

(76) Inventor: Conrad J. Kulik, 37177 Fremont Blvd., Suite F-5, Fremont, CA (US) 94536

( * ) Notice: Subject to any disclaimer, the term of this patent is extended or adjusted under 35 U.S.C. 154(b) by 0 days.

(21) Appl. No.: 09/852,952

(22) Filed: May 10, 2001

Related U.S. Application Data

(63) Continuation-in-part of application No. 09/415,937, filed on Oct. 8, 1999, now Pat. No. 6,251,826.
(60) Provisional application No. 60/202,569, filed on May 10, 2000.

(51) Int. Cl.[7] ............................. A01N 43/16; C05C 9/00; C05G 3/06; C05G 5/00
(52) U.S. Cl. ................................. 504/140; 71/23; 71/28
(58) Field of Search ................................. 71/23, 24, 54, 71/64.03, 28; 504/140

(56) References Cited

U.S. PATENT DOCUMENTS 5,021,077 A  *  6/1991  Moore ........................... 71/17
6,287,496 B1 *  9/2001  Lownds ....................... 264/118

* cited by examiner

Primary Examiner—S. Mark Clardy
(74) Attorney, Agent, or Firm—Howard E. Lebowitz

(57) ABSTRACT

A process for making a slow release high nitrogen fertilizer comprising mixing agricultural products, a surfactant and urea at elevated temperature and then pelletizing the fertilizer. Fertilizers made by the above process.

20 Claims, No Drawings

SLOW ACTING FERTILIZER COMPOSITION AND METHOD

This application is a continuation-in-part of my Ser. No. 09/415,937 now U.S. Pat. No. 6,251,826, filed Oct. 8, 1999 and claims the benefit of my provisional application No. 60/202,569 filed on May 10, 2000 with respect to new material.

BACKGROUND OF THE INVENTION

1. Field of the Invention

This invention relates to methods of producing slow release fertilizers made from urea and agricultural materials and slow release fertilizer compositions made according to the methods.

2. Description of the Prior Art

Grass turf and other cultivated plant crops are often grown using chemical fertilizers and pesticides. While these materials support a highly productive agricultural environment, the use of pesticides produces a soil environment substantially different from the natural soil ecosystem which has been characterized as a foodweb in which plant species evolved. Natural systems are characterized by a rich and diverse biomass activity with bacteria and fungi at the lowest level and predators such as protozoa, nematodes, earthworms, and higher level predators such as millipedes, centipedes, beetles, spiders and even small mammals. These organisms perform critical functions such as decomposing nutrients, retention of nutrients in the soil, symbiotic relationships involving transfer of nutrients into the roots, imparting immunity to disease, and controlling population of pathogenic organisms.

Prolonged use of pesticides has led to soil environments devoid of the natural bacterial and fungal activities and therefore also the larger predators in the foodweb. Pathogenic microorganisms gradually develop immunity to the pesticides and stronger and more potent chemicals are required. At the same time, these powerful chemicals are broad based toxins in themselves and are increasingly observed as pollutants in the air, soil and water and their use is increasingly regulated, restricted or prohibited.

There is a need for a soil additive which will promote the proper balance of microorganisms in the soil needed for healthy plant growth without or with minimal use of synthetic chemical pesticides. There is also a need for a method for systematically manipulating the activity of bacteria and fungi in soil to promote healthy plant growth.

Some applications of the use of alfalfa as a source of organic material are known. Prior to the availability and wide use of ammonia based fertilizers, alfalfa was been widely used for crop rotation, since as a legume it increased the nitrogen content of soil. Alfalfa is also known as a so-called "green manure", a crop which is cut before it reaches full maturity and then incorporated back into the soil for soil improvement. Ground alfalfa meal and alfalfa pellets have been reported to have efficacy as a fertilizer for roses and irises. Alfalfa meal and pellets are often listed as one of a plethora of sources of organic matter for organic vegetable gardening. U.S. Pat. No. 4,767,440 discloses the use of pulverized wheat straw and alfalfa hay in substantially equal volumes as a potting medium to be used as a substitute for peat moss.

Alfalfa often has seeds of wild grasses and weeds incorporated with it which would present a problem if alfalfa would be used to fertlize a grass turf or in other large scale plantings where the wild grasses and weeds are objectionable. Also alfalfa meal or pellets do not quickly wet and incorporate into the soil, and can be blown by the wind or present an unpleasant appearance or interfere with golfers when placed on a grass golf turf There is a need for an alfalfa composition which avoids the spreading of weeds, which can be readily applied, and which will quickly disintegrate and incorporate into the soil.

Organic soil additive compositions, such as those containing alfalfa, are best used with a high nitrogen fertilizer component. Many high nitrogen fertilizers are available such as ammonia, urea, and urea formaldehyde compositions, such as methylene urea as disclosed in U.S. Pat. No. 5,102,440, as well as other urea formaldehyde compositions. The advantage to the urea formaldehyde compositions are that they are characterized as being slow release compositions. Fast release high nitrogen fertilizers such as ammonia or urea are water soluble and as such are quickly released resulting in the fertilizer being washed away or producing "bum" on the plants, while slow release fertilizers avoid this problem. However, slow release urea formaldehyde fertilizers are substantially more expensive than fast release fertilzers such as urea or ammonia, hence the latter are still preferred.

There is a need for a new fertilizer formulation which renders urea into a slow release form when mixed with organic soil additives such as alfalfa containing soil additives.

SUMMARY OF THE INVENTION

My invention deals with a slow release fertilizer comprising agricultural materials, preferably including agricultural waste materials and urea. Preferred agricultural materials include alfalfa, other legumes, raisin stems, other fruit stems, rice bran, cotton seed, and nut shells such as walnut shells. I prefer that at least some of the components are high in tannins. Tannins are a phenolic component of plant materials which are concentrated in stems, stalks, and skins of plants. A particularly good source of tanins is raisin or generally grape skins.

I have found that alfalfa makes a particularly good soil additive for adding onto soil to promote growth of grasses and other plants. I have learned how to effectively use alfalfa by first pulverizing the alfalfa, then adding a wetting agent and the pelletizing the mixture of alfalfa and wetting agent so that the pellets can be conveniently applied but will quickly deteriorate when watered due to the interaction of the alfalfa with the wetting agent.

I prefer to use organic fertilizers, such as the above alfalfa fertilizer, in conjunction with a high nitrogen fertilizer such as urea. Urea is an excellent fertilizer for providing nitrogen for plant growth, however the nitrogen is made available to the plants too rapidly and urea tends to be quickly washed away because it is water soluble. Urea is made available to the plants by bacterial action which converts it to ammonia, which in turn is converted to nitrates which the plant can use as a nitrogen source for protein synthesis. When urea is placed out alone only a portion is actually utilized by the plant and the rest is washed away or evaporated. There is also a possibility of "burning" as is s well know problem in fertilization of grasses where too much nitrogen is made available to the plant in too short a time. In order to avoid this problem people have invented slow release forms of urea, in particular methylene urea and other urea formaldehyde reaction products such as are disclosed in U.S. Pat. No. 5,102,440. These formulations are characterized as having only a small fraction of soluble urea, and the rest is slowly converted to urea and ultimately nitrates by soil bacterial action. However, methylene urea or other urea formaldehyde components are very expensive compared to the other components, such as urea or ammonia fertilizers.

I have now discovered that if urea is mixed with agricultural materials such as alfalfa and raisin stems which have been pulverized and mixed with a surfactant, and that mixture of agricultural materials is heated in the presence of steam to an elevated temperature exceeding 170° F., and then pelletized the pelletized feed has the desirable property that the urea is released slowly of a period weeks rather than quickly as would be expected had the materials not undergone the treatment as described above. The pellets readily disintegrate when exposed to water. The best results are obtained when the agricultural materials have been pulverized to about 16 Mesh, and the treatment time between ambient temperature and the elevated temperature is about 30 minutes.

I believe that the slow release properties are the result of a reaction between urea and tannins in the plant matter, or possibly proteins and carbohydrates which are complexed by the tannins.

It is an object of the invention to produce a high nitrogen slow release fertilizer containing agricultural materials and using urea as a nitrogen source.

DESCRIPTION OF THE INVENTION

The present invention includes several related soil additive compositions and methods for using them to promote healthy plant growth with minimal or more preferably without the use of pesticides. The elements of the invention cooperate to restore and maintain fungal and bacterial populations in the proper balance in the soil. These bacteria and fungi are themselves beneficial to plant health and growth, and are the lowest level of a food chain including predators such as protozoa, nematodes, earthworms, and higher level predators such as millipedes, centipedes, beetles, spiders and even small mammals which are also beneficial. These organisms perform critical functions such as decomposing nutrients, retaining nutrients in the soil, symbiotic relationships involving transfer of nutrients into the roots, imparting immunity to disease, and controlling population of pathogenic organisms. Bacteria, fungi, and the higher predators are typically depleted in soils which have been maintained with chemical fertilizers and pesticides. It is often necessary or desirable to reduce or eliminate the use pesticides. The present invention is useful in restoring the soil environment in such circumstances. Primary elements of the compositions include granular humate ore, alfalfa mixed with a synthetic wetting agent, and a calcium source which can include either calcium oxide or calcium carbonate.

The word humate is derived from the word humus which refers to organic residues in the soil which are products of the decomposition of plant matter. Humus is an important soil constituent for enhancing plant growth. Humic acid is the portion of soil humus that is soluble in alkaline solution but insoluble in acid solution. Humic acid is often added to soil to increase fertility. Humic acid is found in rotting vegetable matter, compost and manure. Humic acid is also be obtained from peats, manure, lignite, leonardite and low rank or even higher rank coals by chemical processes typically including extraction with caustic soda or biological processes. These materials from which humic acids are produced are frequently called humates.

In this invention, granular humate ore is used in a more limited sense, including potential sources of humic acids deriving from the decayed plant materials from ancient plant life which were deposited in the earth millions of years ago and were subject to biological and geological processes over time in the process which ultimately leads to the formation of coal. Granular humate ores include peats (a coal precursor which is characterized by having some free cellulose) and carbonaceous materials mined in the vicinity of peat deposits, low rank coals, naturally oxidized coals such as leonardite, and coals and artificially oxidized or treated coals from which humic acids can be produced. Materials such as compost, manures, and recently decayed plant or animal life are not included, nor are solutions of humic acids which have been produced and extracted from humus or granular humate ores.

Granular humate ore is a solid material which is substantially insoluble in water. If the material is a peat or peat like material it has typically been broken up and air dried in the sun. Granular humate ores are characterized by their cation exchange capacity, which is often expressed in the units of milliequivalents per 100 grams (meq. per 10 g.). Granular humate ores have cation exchange capacities between about 25 and about 600 meq. per 100 g. Beneficial results can be obtained over this entire range though the preferred sources are peat or materials mined around peat deposits having a cation exchange capacity over 300 meq. per 100 g and preferably between about 500 meq. per 100 g. and about 600 meq. per 100 g. A suitable granular humate ore is a material mined around a peat deposit having a cation exchange capacity of about 500 meq. per 100 g sold under the trade name HUMATE AG 1635 sold by Humate International, Inc.

Granular humate ore is the component of the invention which promotes primarily the growth of fungal mass in the soil. It will be discussed that it is desired to maintain a certain ratio of fungal mass to bacterial mass in the soil depending on the plant family. Granular humate ore is used rather than humic acids, composts, animal manures or the like because granular humate ore releases its organic materials in a slow and sustained manner, rather than quickly. Granular humate does not contain proteins, fats, or carbohydrates and is principally broken down and utilized by fungi. I have found that the beak down of granular humate is greatly facilitated by a calcium source which should be co-present with the granular humate ore. The calcium source should include either calcium carbonate or calcium oxide. Calcium is also a plant nutrient and can be used for soil pH control and may be administered at different times during the year, however for the best operation of this invention it is important to apply the calcium contemporaneously with the granular humate ore. I have found that other forms of calcium such as calcium sulfate are not acceptable substitutes for calcium carbonate or calcium oxide. Calcium carbonate is the preferred form.

Alfalfa for this invention should be pulverized to a size which will pass through a 48 mesh screen and preferably a 100 mesh screen. The size is important because alfalfa will contain seeds from weeds and wild grasses which will contaminate the soil. Pulverizing the alfalfa destroys these seeds. This is particularly important if the compositions will be applied on grass. Alfalfa normally contains a variety of microbes and notably cyanobacteria. It is preferred that the alfalfa be treated in a manner which leaves a population of cyanobacteria remaining after pulverizing. Cyanobacteria are killed at temperatures in the range of 165° F. to about 185° F. so it is preferred that the alfalfa not be exposed to a temperature above 185° F. and preferably not above 165° F.

When alfalfa is applied alone to soil it does not quickly break down and deteriorate. This is particularly true when the pulverized alfalfa is formed into small pellets, extrudates or granules which are typically from about 1/16th of an inch in diameter to 1/4 inch in diameter and 1/2 inch to an inch long. Such pellets are a convenient way to handle and distribute the alfalfa without excessive wind losses and are a preferred form of the product. Pellets, extrudates, and granules may be formed in any of a variety of conventional equipment used for that purpose in industry. A preferred device is a pellet mill. Rapid break down of the alfalfa is important to make it available to soil bacteria. In the case where the invention is used on grass covered soil of a lawn or golf course the presence of the alfalfa pellets is detrimental to the appearance and interferes with golfing making alfalfa alone generally unsuited for such applications. If the alfalfa is not pelletized, there is excessive wind loss. I have found that the addition of the wetting agent to the alfalfa makes the alfalfa deteriorate rapidly, usually within a few hours, while a much longer period would be required without the wetting agent. Preferred wetting agents are in the class of nonionic wetting agents, though other wetting agents such as anionic, cationic or ampholytic agents may also be used. A preferred way to apply the wetting agent is to mix a liquid wetting agent with the pulverized alfalfa such that the wetting agent is absorbed by the alfalfa. The amount of wetting agent is between about 0.25 gallons per ton and 2.5 gallons per ton of alfalfa, and more preferably between 0.5 and 1.5 gallons per ton of alfalfa. Since the wetting agents are an expensive component, I prefer to use as little as possible while getting a rapid enough deterioration of the alfalfa. A preferred nonionic wetting agent is sold under the trade name AQUA-AID manufactured by Aqua-Aid, Inc. and contains alkyl ethoxylates, dodecyl benzene sulfonates, and oleic diethanolamides.

In order for the alfalfa to be efficiently used by bacteria it is desirable to lower the carbon to nitrogen weight ratio from 12 or 13 to 1 found in alfalfa to a value below 10. This allows the alfalfa to be consumed by the microbes, principally bacteria, and become incorporated in the microbial mass which will ultimately be consumed by predators and converted into a form useable by the plants. I prefer to mix the alfalfa and wetting agent with one or more high nitrogen fertilizers for this purpose. Suitable fertilizers for mixing include urea; urea formaldehyde products such as urea formaldehyde, polymethylene urea, methylene urea, methylene diurea; triazone and substituted triazones; isobutylene diurea; monomethylol urea; crotonylidine diurea; diammonium and monoammonium phosphates; urea phosphate; ammonium nitrate; ammonium sulfate; animal blood; tankage; and cotton seed. Tankage is a byproduct of animal slaughtering made up of meat scraps, bone, and blood.

Calcium nitrate and or potassium nitrate may be optionally added. These compounds do not promote bacterial growth but are a form of nitrogen readily used by the plants without microbial action. Such compounds are often desired because some time is required for the degradation products from the alfalfa and high nitrogen fertilizers to be available to the plants.

I prefer to limit the addition of total soluble phosphates, such as ammonium phosphates used as sources of high nitrogen content and other soluble phosphates such as potassium phosphate which may be added for phosphate content, when expressed as $P_2O_5$ to less than 2%, preferably less than 1%, and most preferably about 1/2% of the total mixture. The reason for this is that in the natural microbial system promoted by my invention, phosphorus is transferred to the plants from insoluble sources through the symbiotic associations of fungi and plant roots known as mycorrhizae. These associations are reduced or absent in soil which has been fumigated with fungicides and in such systems without sufficient microbial presence it is necessary to supply phosphorus in a water soluble form which be taken up directly by the roots. The mycorrhizae do not thrive and remain attached to the roots if there is too much soluble phosphate available. Mycorrhizal activity is measured as a percentage of root coverage, which can be measured in the laboratory by well known procedures.

A preferred mixture includes alfalfa, wetting agent, with nitrogen fertilizer components added to bring the nitrogen content between about 6% and about 15%, more preferably between 6% and 10%.

The alfalfa and wetting agent are preferably mixed with the high nitrogen fertilizers and optional nitrate additives. The mixture can be applied in fine pulverized form or preferably manufactured into pellets, extrudates, granules or other agglomerates. Pellets, extrudates, and granules may be formed in any of a variety of conventional equipment used for that purpose in industry. A preferred device is the device commonly referred to as a pellet mill, where the material is forced through openings in a drum rotating around one or more internal rollers. Other devices such as a compacting mill are also suitable as are the many devices and methods for size enlargement described in pages 8–60 to 8–72 of Perry's Chemical Engineer's Handbook, Sixth Edition, McGraw-Hill, 1984, which is hereby incorporated herein by reference. The purpose of size enlargement is convenience of application and to prevent wind loss. Binders and lubricants may be used. When a pellet mill is used a preferred lubricant is rice hulls.

The alfalfa and additives mixture may be applied alone or combined with the granular humate ore and calcium components. A preferred annual program includes some applications where all the components are applied together and other separate additional applications of alfalfa, wetting agent, high nitrogen fertilizer, and optional nitrates, and other applications of only calcium. For the best results of this invention, alfalfa, wetting agent, and high nitrogen fertilizers are added together and calcium is added with granular humate ore. It is preferable to combine the ingredients where possible because their mutual interaction is beneficial, and to reduce the additional costs of separate applications.

When a grass is the plant being grown, it is desirable to add the combined applications and humate—calcium applications so that as much as possible of the materials are applied within the thatch zone, preferably at least 50%. Thatch is a collection of trimmings and fallen plant materials which accumulates at the soil surface. Thatch accumulation is a problem because it impedes the flow water into the soil. The ingredients of this invention promote the growth of microbial species which quickly decompose the thatch and recycle its ingredients to the soil foodweb in a manner ultimately useable by the grass. A convenient way to make the applications is to apply the soil additives of this invention immediately following aerification. Aerification is a process where small holes are mechanically made in the soil to incorporate air. When the ingredients are applied after aerifacation they fall into the holes. It is preferable to drag over the soil with large mats after application to further fill the aerification holes with the additive ingredients.

EXAMPLE 1

Preferred alfalfa mixtures were prepared by mixing alfalfa, which had been pulverized to −100 mesh and was checked for positive cyanobacteria content, with the AQUA-AID wetting agent and methylene urea high nitrogen fertilizer as indicated in the following proportions:

|  | Mixture 1 | Mixture 2 |
|---|---|---|
| Alfalfa | 82.1% | 52.7% |
| AQUA-AID anionic wetting agent | 0.4% | 0.6% |
| Methylene urea | 17.5% | 15.2% |
| Cotton seed | — | 5.6% |
| Animal Blood | — | 11.1% |
| Ammonium nitrate | — | 3.3% |
| Monoammonium phosphate | — | 0.7% |
| Potassium sulfate | — | 10.2% |
| Micro-nutrients | — | 0.6% |
| Nitrogen Content | 7% | 9% |

In Mixture 2 potassium sulfate and micro-nutrients were added for convenience as conventional plant fertilizer components.

EXAMPLE 2

A preferred annual treatment program is as follows in pounds per 100 square feet of soil surface:

|  | Range | Preferred Range |
|---|---|---|
| Alfalfa mixture of Mixture 1 or 2 in Example 1- | 2–10 | 3–7 |
| Granular Humate Ore- | 0.5–4 | 1–3 |
| Calcium Carbonate or Calcium Oxide (as Ca)- | 0.8–4 | 1–3 |

The annual treatments are preferably divided into several applications per year with an application of all the ingredients applied together in the spring and fall, supplemented by additional applications of the alfalfa mixture in three additional applications, one in the spring, one in the early summer, and one in the fall. Calcium may be divided roughly equally between 5 to 9 applications per year, though applications including granular humate should preferably always include contemporaneous applications of calcium. Another suitable scheme is to apply three combined applications supplemented by 2 to 6 supplemental applications of calcium.

Where grass is being treated it is preferable to make the applications coincide with aerification of the soil so that the additives may be injected into the aerification holes and thus be deposited into the thatch zone. The additives may be applied to the soil by conventional equipment such as a drop spreader or distributed with a broadcast spreader. If the additives are applied after aerification it is preferable to use dragging to fill the holes.

EXAMPLE 3

A plot of grass was treated with an alfalfa mixture approximately as Mixture 2 in Example 1, granular humate ore HUMATE AG 1635, and calcium carbonate. The granular humate was applied at an annual rate of 2 pounds per 100 square feet, and alfalfa mix at an annual rate of 5 pounds per 100 square feet, and calcium carbonate at an annual rate 4.5 pounds per 100 square feet (1.8 pounds per 100 square feet expressed as Calcium). The humate was applied in two applications, one in the spring and one in the fall. The alfalfa mixture was split between 5 applications two corresponding with the humate applications and two supplemental applications in the spring and one in the fall. No pesticides were used, though these had been previously used extensively leaving the soil depleted in microbial content, particularly depleted in fungi and dominated by bacteria. The visual appearance of the grass improved markedly soon after treatment started and after the first six months of treatment the fungal mass had increased substantially. The mycorrhizal colonization increased with treatment. The fungal disease in the roots decreased substantially, even though the use of fungicides was discontinued entirely. The grass was free of apparent turf grass diseases and pests, including anthranose, necrotic ring spot, root eating nematodes, pythium, and fusarium. The turf was free of the condition commonly known as "black layer", a combined microbial and physical conditions frequently found on golf course turf The table, below contains soil and root analysis data from the test.

|  | Bacterial Biomass (microg/g) | Fungal Biomass (microg/g) | Bacterial to Fungal Ratio | Percent root coverage by Mycorrhizae | Percent fungal diseased roots |
|---|---|---|---|---|---|
| Treated | 124 | 31 | 4 | 3 | 15 |
| Untreated | 298 | 15 | 20 | 2 | 25 |

Note that the ratio of bacterial to fungal biomass in above table decreased from 20 in the untreated soil to 4 in the treated sample. Different botanical families have different ranges of characteristic ratios of bacterial to fungal biomass which are observed when plants of that family grow uncultivated in nature. For grasses (Poaceeae) the range of ratios is about 0.65 to 2. These characteristic ratios can often be found in the literature, or alternatively can be measured experimentally. The analyses for bacterial biomass, fungal biomass, Micorrhizal coverage, and diseased roots are well known laboratory tests. The soil in this case started out deficient in fungal mass and is progressing to within the natural range. It is preferable to have the bacterial to fungal ratio as near as possible to the natural range to promote optimal plant health without use of pesticides and fungicides. The soil in this example may reach a steady state within the desired zone. If it does not reach the desired range it can be adjusted by increasing the humate treatment rate to favor fungal mass growth. If the ratio had been to high in fungal mass, the alfalfa mixture application rate would be increased to increase bacterial growth.

EXAMPLE 4

I have attempted to treat soils with just one of the component of the invention, either the granular humate/calcium or alfalfa component, and I have found that better results are obtained with the mixture, particularly in obtaining disease resistant growth in soils which have been previously treated with pesticides. When I treated grass growing in soils which were fungus dominated with granular humate ore/calcium treatment alone, after a period of time the soil became fungal dominated and the treatment was detrimental in that the grass's failure to thrive was apparent from visual observation. In contrast similar grasses treated with combined treatment of alfalfa mixture and humate ore produced rapid improvement.

Examples of the naturally occurring ratios of bacterial to fungal biomass are as follows: Grasses—0.65 to 2, Berries, shrubs, grapes-0.2 to 0.5, Deciduous trees—0.1 to 0.2, and Conifers—0.01 to 0.1.

Since my invention relies on establishing a balanced microbial foodweb to promote the growth and health of the plants, and since the environment thus formed establishes disease and pest resistance, I prefer to minimize the use of synthetic pesticides and more preferably not to use any form of synthetic pesticides. When I refer to pesticides I include all synthetic chemicals which are used for controlling, preventing, destroying, or repelling pests, including fungicides, herbicides, insecticides, nematicides, desiccants, and defoliants. When my invention is applied to grass, I have found that the grass is generally resistant to common grass diseases and pests including anthanose, necrotic ring spot, root eating nematodes, pythium, fusarium, and black layer.

A preferred method of implementing my invention is to apply alfalfa mixture, granular humate and calcium to the soil as described in Examples 2 and 3 while periodically monitoring the bacterial to fungal biomass ratio in the soil and comparing it to the natural range observed when plants of the same family grow uncultivated in nature. I prefer to monitor the soil about every 3 months. The application rates are adjusted by increasing the alfalfa treatment rate if the ratio is on the low side of the range or increasing the granular humate treatment rate if the ratio is on the high side of the range, or not making an adjustment if the ratio is within the range.

An alternative method which is particularly preferable for promoting the growth of grapes is to apply alfalfa mixture, granular humate, and calcium to the soil as described in Examples 2 and 3 while periodically monitoring the mycorrhizal coverage of the roots. I prefer to maintain a coverage above 40% for grapes. If the coverage is below about 40% the granular humate treatment rate should be increased. Maintaining this mycorrhizal coverage is indicative of healthy grape plants and improves the juice quality.

The invention can also be applied to the soil when seeds are planted. In this case I prefer to add the alfalfa mixture, granular humate ore, and calcium source to the soil contemporaneously with the seeds. I have found that this treatment leads to improved germination rates and plant health. The preferred annual application rates in pounds per 100 square feet of soil surface are as follows:

|  | Range | Preferred Range |
| --- | --- | --- |
| Granular humate Ore | 0.2–2 | 0.5–1.5 |
| Calcium source (as calcium) | 0.1–1 | 0.3–0.7 |
| Alfalfa, wetting agent, high fertilizer mixture | 0.5–2.5 | 0.7–1.5 |

In soils which have been extensively treated with pesticides it is possible that there will be little or no bacterial or fungal biomass present. While these microbes are generally ubiquitous. it is often preferable to inoculate the soil with microbes. Inoculants are available as commercial products which may be applied at the beginning of treatment.

It is necessary to apply sufficient fertilizers containing nitrogen, potassium, phosphates and micro-nutrients needed to supplement the values present in the soil additive depending on the options chosen. The requirements are well known for particular plants.

Slow Release Fertilizer

I have found that other agricultural materials work well in addition to or even in place of the alfalfa in the previous examples. I have tested rice bran, cotton seed and raisin stems as organic materials and all work well. These materials may be used either individually or in groups, with the organic agricultural materials mixed with a wetting agent as specified for preparing the alfalfa fertilizer. The organic materials are preferably pulverized to pass through 16 Mesh and more preferably 48 Mesh. I believe that walnut shells and soy bean meal, and other legumes, and cedar saw dust are also suitable as will the concentrate of skin and seeds filtered from pomace in wine making. The use of these or other waste products to supplement or replace the alfalfa is desirable since they are less expensive and recycling these waste materials is beneficial to the environment. As will be noted below I particularly prefer materials which are high in tannins.

I prefer to use the organic fertilizers in conjunction with a high nitrogen fertilizer such as urea. Urea is an excellent fertilizer for providing nitrogen for plant growth, however the nitrogen is made available to the plants too rapidly and urea tends to be quickly washed away because it is water soluble. Urea is made available to the plants by bacterial action which converts it to ammonia, which in turn is converted to nitrates which the plant can use as a nitrogen source for protein synthesis. When urea is placed out alone only a portion is actually utilized by the plant and the rest is washed away or evaporated. There is also a possibility of "burning" as is a well know problem in fertilization of grasses, wherein too much nitrogen is made available to the plant in too short a time. In order to avoid this problem people have invented slow release forms of urea, in particular methylene urea and other urea formaldehyde reaction products, for example such as those which are disclosed in U.S. Pat. No. 5,102,440. These formulations are characterized as having only a small fraction of soluble urea, and the rest is slowly converted to urea and ultimately nitrates by soil bacterial action.

I have now discovered that it is possible to make a slow release nitrogen product by reacting urea with agricultural products such as a mixture of raisin stems and alfalfa.

EXAMPLE 5

I mixed the following ingredients were mixed according to the method which follows:

| Raisin Stems | 837 pounds |
| --- | --- |
| Alfalfa | 300 pounds |
| Rice Bran | 200 pounds |
| Urea | 350 pounds |
| Potassium Sulfate | 200 pounds |
| Iron ligno sulfonate | 5 pounds |
| Humate | 50 pounds |
| Kelp | 50 pounds |
| Surfactant (wetting agent) | 8 pounds |
| Total | 2000 pounds |

The raisin stems and alfalfa were pulverized to 16 Mesh. The pulverized alfalfa and raisin stems were then mixed and blended with the other ingredients. About 5 tons per hour of the above materials were mixed with about 400 pounds per hour of 350° steam in a mixing drum to produce a mixture at an average temperature of about 170° F. The mixture was then formed into pellets in a pellet mill. The pellets once cooled were bagged. The approximate time when the mixture was exposed to elevated temperatures ranging from 350° to ambient was about 30 minutes from feeding the material to the pellet mill and cooling to ambient.

The above fertilizer was placed on grass at golf course fairways and greens, with an application rate of about 0.5 lb. of Nitrogen per 1000 square feet.

It took over a week to be able to notice the effect of the fertilization effect by a greening in the color of the grass compared to a change within a day or two if urea alone were used as fertilizer. However the effect of the fertilizer continued to be apparent for at least six weeks, as evidenced by a progressively darker green color of the grass.

Those skilled in the art will appreciate that with this application rate using urea alone, or urea mixed with organic components without heat treatment, the result is a quick burst of fertilizing effect within a day and a need to add more fertilizer after about two weeks or less.

Without being bound by the following explanation, I believe that the effect of binding the urea to the plant material is at least in part related to the high tannin content of raisin stems in Example 5. Tannins are well known to complex protein, cellulosic, and carbohydrate materials. I believe that when urea is contacted with the plant materials at the steaming conditions in the pelletizing process, urea is complexed and reacted with the tannins, carbohydrates, proteins and cellulosic materials to form the slow release fertilizer.

A preferred embodiment of my invention is a process for forming a slow release fertilizer by reacting plant materials with urea in the presence of steam at an elevated temperature preferably ranging from about 170° F. to about 350° F. Preferably the plant materials contain at least one high tannin component. Tannins are often concentrated in stems, seeds, and fruit skins and raisin or grape stems, seeds, and skins are a good source, as are others such as walnut shells. Those skilled in the art will know of many sources of high tannin materials. The mixture of plant materials is preferably pulverized to about 16 Mesh. I have found that I can relax the particle size requirement to 16 Mesh as compared to the embodiment comprising alfalfa which which is not heat treated without having a problem with spread of fertile weed seeds. A wetting agent is also added to the mixture. The heat treated mass is extruded or pelletized to form a convenient pellet fertilizer. The wetting agent promotes reaction of the urea and plant matter during the process and leads to a fertilizer which will quickly break down when applied to the soil and watered. I also prefer to include granular humate in the mixture for the reasons previously stated that humate promotes growth of soil fungus. I also have found that inclusion of blood in the mixture is beneficial. Blood is a natural slow release high nitrogen fertilizer.

While I have described preferred embodiments of the invention, it is apparent that modifications may be made thereto, and I therefore wish it to be understood that the invention is not limited to the specific embodiments disclosed, but rather I intend all embodiments which would be apparent to one skilled in the art which come within the spirit and scope of the invention.

I claim:

1. A method for making a slow acting, high nitrogen fertilizer comprising the following acts:
   a) blending a mixture of components comprising pulverized alfalfa, urea, a synthetic wetting agent and at least one high tannin component chosen from the group consisting of pulverized raisin stems, pulverized grape stems, and pulverized nut shells, wherein said mixture of components comprises between about 52% to about 82% of alfalfa plus the at least one high tannin component and the amount of urea is chosen such that said mixture of components has a nitrogen content between about 6% and about 15%;
   b) heating said mixture of components to an elevated temperature above about 170° F. in the presence of steam to form a reacted mass; and
   c) forming said reacted mass into fertilizer pellets, whereby said fertilizer pellets may be conveniently applied to a soil surface and will quickly deteriorate when watered and whereby said urea will be slowly released into the soil.

2. The method of claim 1 wherein said alfalfa and said at least one high tannin component are pulverized to a size smaller than about 16 mesh.

3. The method of claim 2 wherein the at least one high tannin component is chosen from the group consisting of pulverized raisin stems and pulverized walnut shells.

4. The method of claim 3 wherein the mixture of components further comprises granular humate.

5. The method of claim 3 wherein the pH of said mixture of components is acidic.

6. The method of claim 1 wherein the act of forming pellets from said reacted mass is performed in a pellet mill.

7. The method of claim 3 wherein the act of forming pellets from said reacted mass is performed in a pellet mill.

8. The method of claim 5 wherein the act of forming pellets from said reacted mass is performed in a pellet mill.

9. The method of claim 6 wherein the act of heating said mixture of components is performed in said pellet mill.

10. The method of claim 7 wherein the act of heating said mixture of components is performed in said pellet mill.

11. The method of claim 8 wherein the act of heating said mixture of components is performed in said pellet mill.

12. The fertilizer pellets prepared according to claim 1.
13. The fertilizer pellets prepared according to claim 3.
14. The fertilizer pellets prepared according to claim 5.
15. The fertilizer pellets prepared according to claim 6.
16. The fertilizer pellets prepared according to claim 7.
17. The fertilizer pellets prepared according to claim 8.
18. The fertilizer pellets prepared according to claim 9.
19. The fertilizer pellets prepared according to claim 10.
20. The fertilizer pellets prepared according to claim 11.

* * * * *